Nov. 26, 1940.　　　R. I. HUMPHREY　　　2,222,842
APPARATUS FOR PRODUCING WEAKENED SCORED PORTIONS IN STRIP MATERIAL
Filed Feb. 23, 1939　　　3 Sheets-Sheet 1
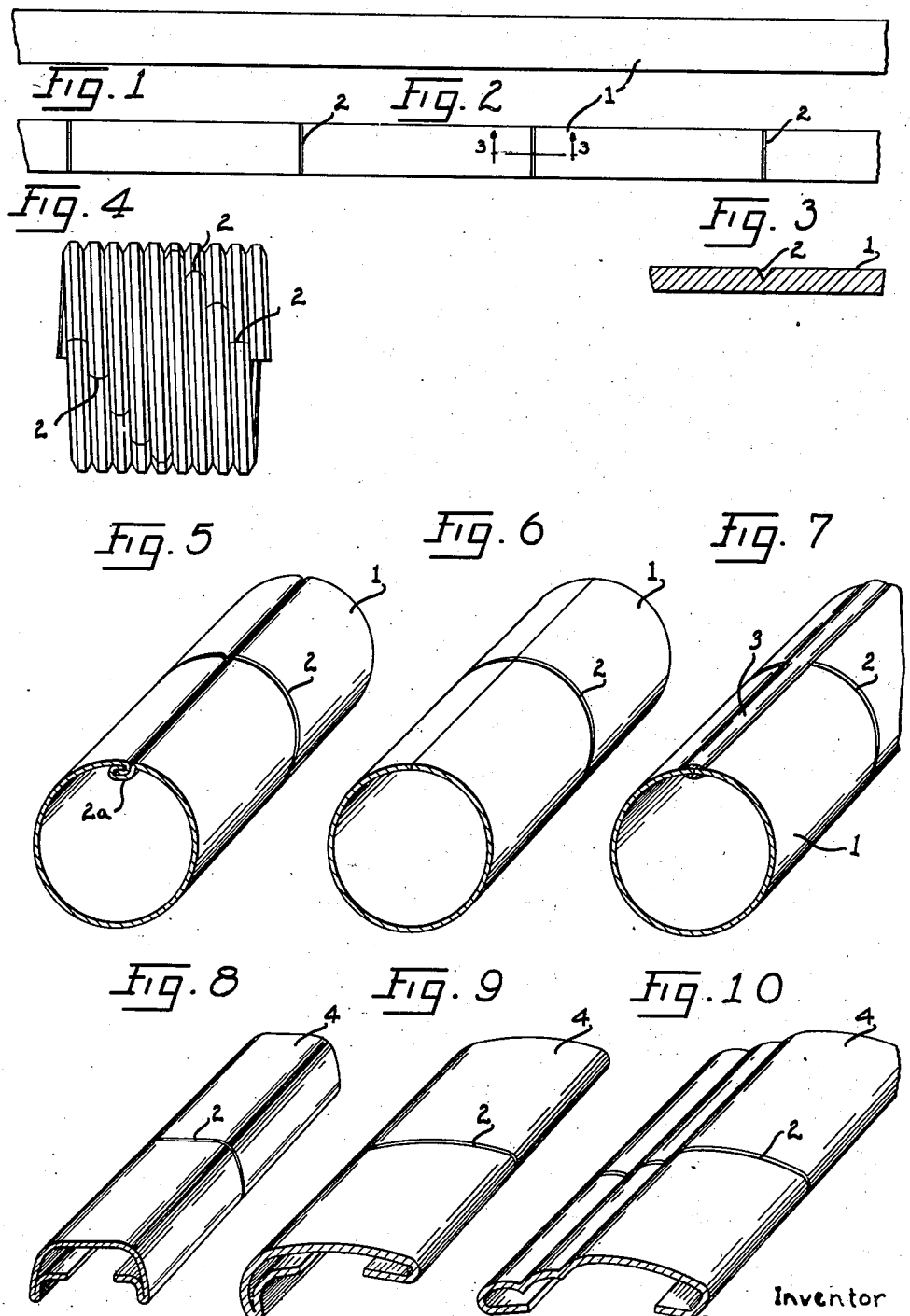
Inventor
ROGERS I HUMPHREY
by Toulmin & Toulmin
Attorneys Inventor
ROGERS I. HUMPHREY
by Paulmin & Paulmin
Attorneys Nov. 26, 1940.    R. I. HUMPHREY    2,222,842
APPARATUS FOR PRODUCING WEAKENED SCORED PORTIONS IN STRIP MATERIAL
Filed Feb. 23, 1939    3 Sheets-Sheet 3

Inventor
ROGERS I. HUMPHREY
by Toulmin & Toulmin
Attorneys

Patented Nov. 26, 1940

2,222,842

UNITED STATES PATENT OFFICE 2,222,842

APPARATUS FOR PRODUCING WEAKENED SCORED PORTIONS IN STRIP MATERIAL

Rogers I. Humphrey, Indianapolis, Ind., assignor to Moulding Patents Inc., Indianapolis, Ind., a corporation of Indiana Application February 23, 1939, Serial No. 257,996

2 Claims. (Cl. 164—11)

The present invention relates to metal working and more particularly to the fabrication of steel moulding and tubing.

In the past, when it was desired to fabricate moulding or tubing out of metal, it has been customary to bend or form the tubing from strip material and then cut it to proper length, either by sawing or by use of a die. This saw-cutting operation was not only slow and expensive, but also left rough or burred edges. Often the hollow section was so small as to leave insufficient room inside for the die portion of the cut-off die, and this insufficiency of space was emphasized in the case of long tubing. Again, when the metal is thin and the die is either dull or misaligned, the pressure exerted by the die might cause serious deformation of the moulding or tubing, even collapse. High speed abrasive disks have also been employed to cut off the tubing, particularly of small diameter stock, but in this case, the disks and the machine for operating the same were quite expensive.

The primary object of the present invention is to provide improved apparatus for severing sheet moulding or tubing to proper lengths, regardless of the length of the tubing from which the piece is severed and also regardless of its size.

Other objects are to provide improved apparatus for severing sheet metal or any other material which lends itself to fracture or rupture when force is applied along a line of weakness of the metal or the material; to provide an arrangement by which sheet material can be bent or otherwise formed into shape and then broken off to size; to provide an arrangement by which tubing can be severed to the proper length without an actual cutting operation; to provide a method of severing which requires the performance of only a simple preliminary operation which can be accomplished at a place remote from the position at which the actual severing operation takes place.

The final object is to provide an improved apparatus for only partially severing the sheet material which is then formed to shape, after which the severing is completed by a manual operation.

These objects are attained in brief by first weakening the material along the line at which it is desired later to sever the material and then shape the material to the desired form, after which the material is broken off at the severance line. Finally, a quick pressure or a smart rap is exerted on the free end of the material to cause a severance along the weakened line. This structure-weakening operation may be accomplished in various ways, such as by line-scoring, separate indentations or any other manner in which the cross sectional area of the strip along the severing line is less than the cross sectional area of the remainder of the strip.

Further objects and features will be apparent when the specification is perused in connection with the accompanying drawings, in which—

Figure 1 is a plan view of a strip of metal which is later formed into a desired shape.

Figure 2 is the same strip, but provided with transverse scoring in accordance with the present invention.

Figure 3 is a cross section, looking along the line 3—3 in Figure 2.

Figure 4 is a fragmentary view of a flexible tubing suitable for adjustable lamps and improved in accordance with the present invention.

Figures 5 to 7 inclusive show typical tubing which can be formed and later broken off to proper lengths by the improved process.

Figures 8 to 10 inclusive show a view of the many formed articles or mouldings which can be fabricated out of the improved strip material and severed to proper length after the forming operation.

Figure 11:
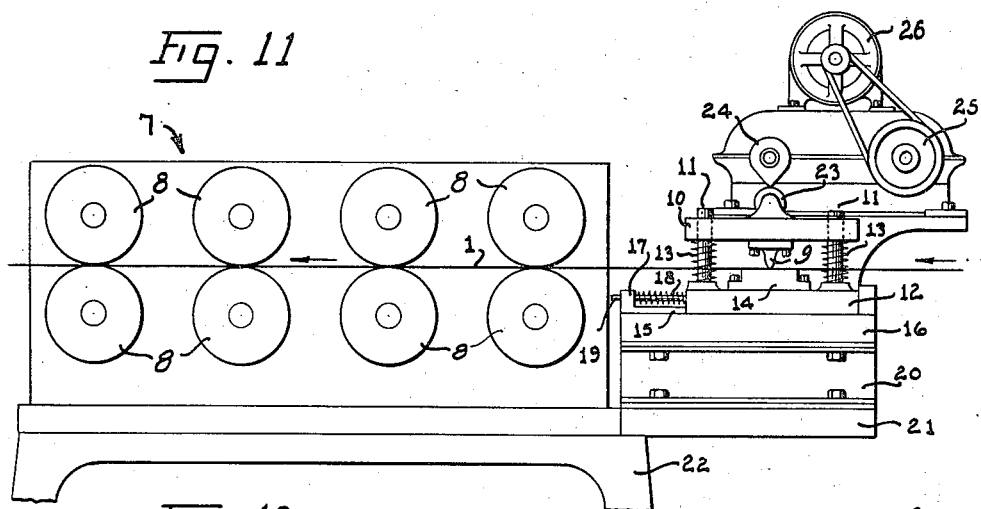
Figure 12:
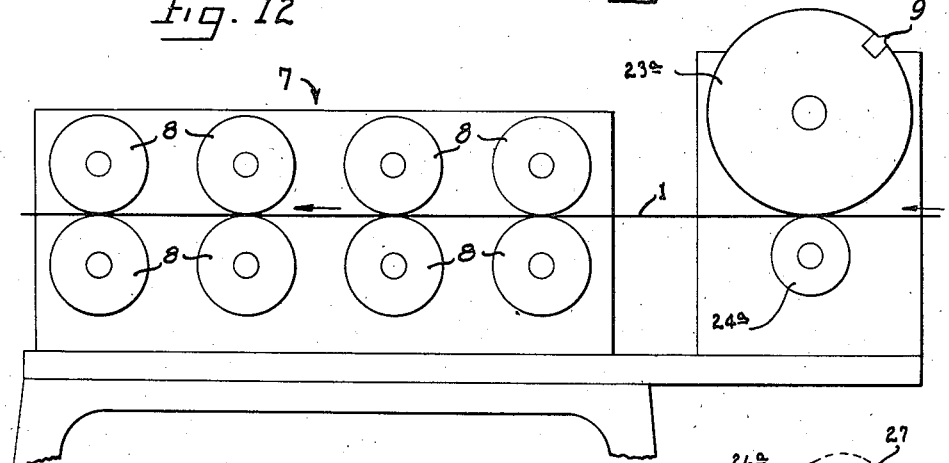
Figure 13:
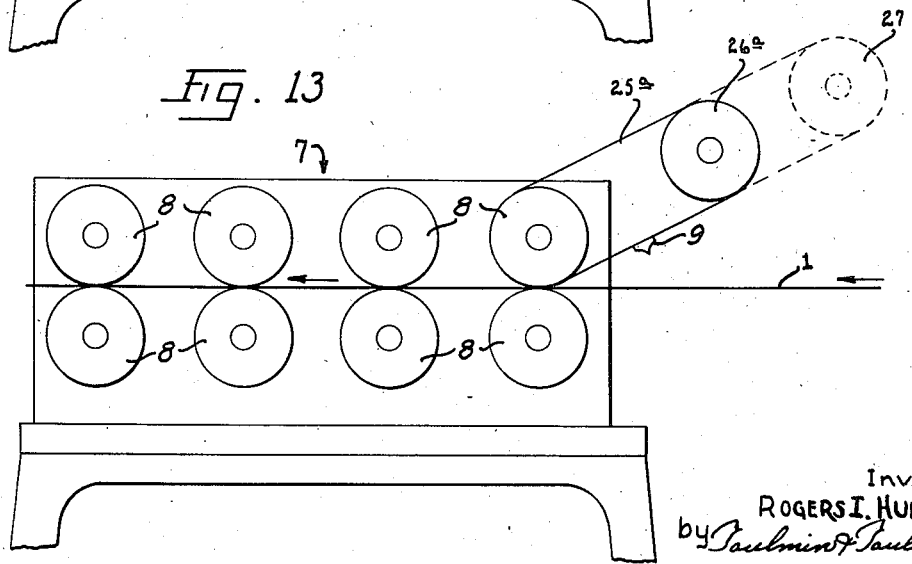

Figures 11 to 13 inclusive illustrate typical machines for scoring, rolling and bending the strip material to shape.

Figure 14:
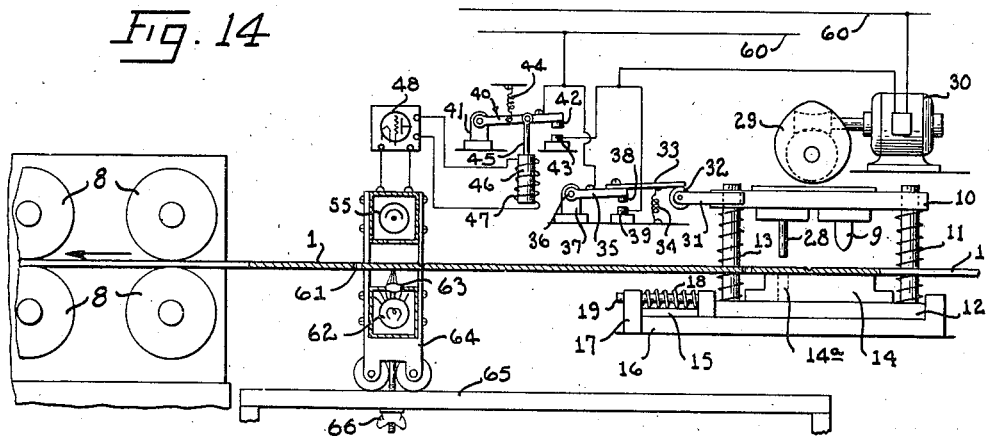
Figure 15:
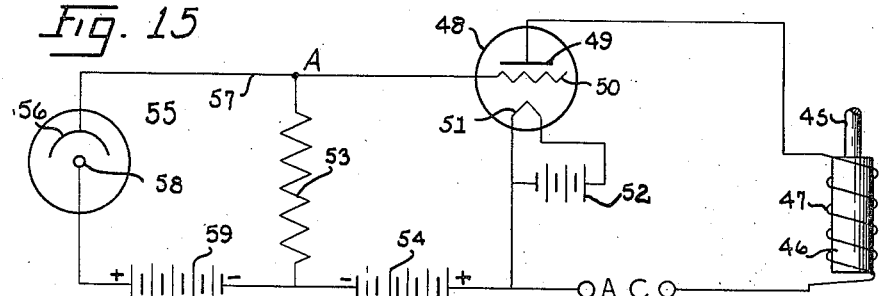

Figure 14 typifies a photoelectric arrangement for controlling the spacing between the scored lines on the strip, and Figure 15 shows the details of the photoelectric control circuit.

Figure 16:
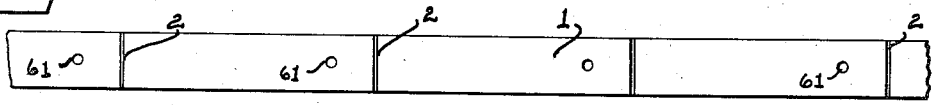

Figure 16 illustrates the use of spaced perforations for determining the distance between the scored lines when employing a photoelectric form of control.

Figure 17:
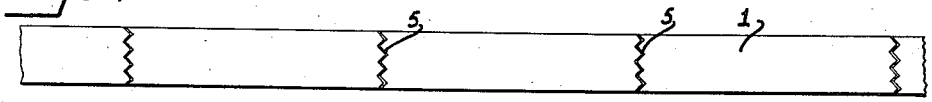
Figure 18:
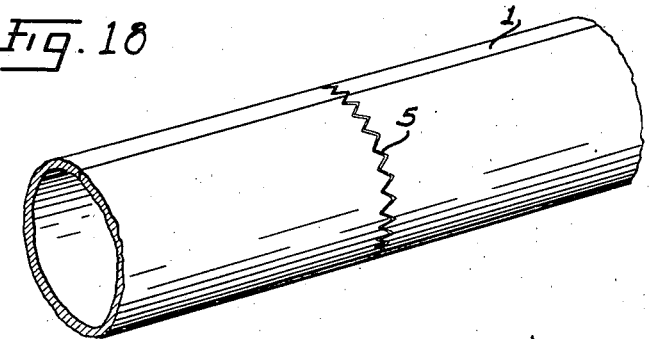

Figures 17 and 18 show respectively a modified form of strip and tubing made in accordance with the present invention and utilizing serrated scoring.

Referring to the drawings, numeral 1 designates a strip of stainless steel or similar material which it is desired to roll lengthwise to form various articles such as flexible conduits shown in Figure 4, the tubing shown in Figures 5 to 7, or the moulding shown in Figures 8 to 10. Heretofore, it has been customary to pass the strip through a machine which has a large number of rolls, some in aligned position and others arranged angularly thereto so that, after leaving the machine, the strip has been formed into any desired shape, depending upon the position and arrangement of the rolls. Machines of this character are well known in the art and consequently no detailed description is necessary. However, such a machine has been diagrammatically illustrated in Figures 11 to 14 inclusive by several pairs of superposed rolls arranged in rectilinear alignment, although it will be understood that these rolls do not, in practice, conform to this arrangement.

In case it is desired to form the strip into a flexible lamp cord conduit or BX cable, as shown in Figure 4, the strip is usually arched down the middle by a forming machine which also serves to wind the arched strip about a mandrel as a continuous helix with the sides or edges of the strip abutting one another. It is often necessary to cut a conduit of this character for installation purposes and the general procedure was to use a hack saw. This procedure is slow, even when a hack saw is available, which is not usually the case, and the arched contour of the strip usually causes the saw to leave sharp edges or burrs. However, in accordance with my invention, the conduit can be readily severed at exactly the proper length, using nothing more than the hand at the place of installation of the conduit.

This improvement is accomplished by the use of transversely extending scores indicated at 2, which represent simply a portion over which the metal has either been cut or merely weakened to such an extent that, when the strip is bent or strained along the scored line, the strip breaks. The effect of scoring is shown in Figure 3. The scoring can be accomplished in many ways, for example, by means of a hammer and chisel or an especially designed scoring blade, but as will be described hereinafter, it is more practical to provide a machine for this purpose. Thus, as the strip is arched to form the individual turns of the conduit shown in Figure 4, the strip does not break at the scored lines, because the force exerted by the forming machines is in a direction transverse to the direction of the line of scoring. However, after the flexible conduit has been fabricated, one can readily grasp an end turn between the fingers and break off as many turns as is necessary at the different scored lines to obtain the proper length of tubing.

Referring specifically to Figure 5, the strip 1 can be rolled down the middle of its length into a tubular form with the ends secured together by an ordinary lock seam indicated at 2a. As in the case of the flexible tubing shown in Figure 4, all of the forming operation shown in Figure 5 takes place in a direction at right angles to the scored lines 2 so that, until a force is exerted parallel to the scored lines, the whole length of the strip will remain intact. After the tubing has been formed, the outside surface of the tubing near the scoring line or lines is given a smart rap with a hammer, or force may be exerted merely by the hand to break the tubing at the line 2.

Figure 6 shows a tubing similar to Figure 5 provided with scored line 2 and in which the edges of the strip simply abut one another without the use of a seam. In Figure 7, the abutting edges of the strip are welded, as at 3, immediately after the tubing comes out of the forming mill. It has been found in practice that, notwithstanding the use of a weld which covers up a portion of the scoring, the tubing can still be readily broken at the scored line 2 by a force exerted in the proper direction and proper place and, of course, providing that the scoring is sufficiently deep.

Figures 8, 9 and 10 show other forms of articles 4 termed "moulding," fabricated out of scored strip material which has been passed through the proper sequence of rolls and later cut to size by fracturing the strip at the scored line 2.

The score line may take a serrated shape, as indicated by reference character 5 in Figure 17, and tubing fabricated of this particular strip material, as shown in Figure 18, can be readily severed to length along the serrated line. In fact, there is no limit as to the number of shapes which the scoring may take, provided that it is sufficiently deep to permit the strip to be broken by a reasonable pressure exerted at the scored line and yet is not deep enough to cause a premature breakage of the strip during the forming operations. It is apparent that, instead of providing a continuous line of scoring, I may employ a series of indentations or other linear deformation of the material.

In Figure 11, I have shown a combined scoring and forming machine for carrying out my invention. The forming machine is indicated generally by the rectangle 7, to which is secured in any suitable manner and rotated by gearing (not shown) a number of rolls 8 superposed in pairs and arranged rectilinearly. The strip 1 is drawn between each pair of rolls, as indicated by the arrow and, after going through the machine, may take any of the forms illustrated in Figures 5 to 10 inclusive.

As stated hereinbefore, the strip is scored before entering the forming machine and, for this purpose, I provide a scoring blade 9 which is carried by an upper block or holder 10 and is adapted to reciprocate in a vertical direction. The block 10 is provided with four holes which loosely receive the upper ends of four posts 11 which are, in turn, secured to a lower block 12. The posts 11 are provided with compression springs 13, which tend to force the upper block away from the lower block. Directly under the scoring blade 9, there is a heavy plate 14 bolted or otherwise secured to the block 12. The latter is provided with a longitudinal groove (not shown), into which slides a tongue 15 secured to a bed plate 16. The tongue 15 is provided, at its lefthand end, with an upstanding abutment 17. A compression spring 18 is positioned between the abutment 17 and the lefthand end of the block 12, this spring being preferably carried on a rod 19. The bed plate 16 may be supported from the forming machine in any suitable manner, for example, through an angle iron member 20 and a plate 21 to a ledge on the frame 22 of the forming machine.

For giving the scoring blade 9 a vertical motion, I provide a reciprocating mechanism which terminates in a roller 23, and against the roller surface bears a cam 24 driven through gearing (not shown) by a pulley 25 and a motor 26. It is apparent that, as the cam 24 is rotated by the motor, the scoring blade 9 is forced downwardly to score the strip 1, as it moves along and, on further rotation of the cam, the springs 11 urge the plate 10 upwardly so as to withdraw the scoring blade. Inasmuch as the strip 1 has a continual movement to the left through the forming machine, and the scoring blade 9 is in contact with the strip 1 during the time that it takes to make the scored line, the blocks 10 and 12 necessarily travel to the left to follow the strip, and the lower block is kept in line by the tongue-and-groove arrangement 15. As the scoring blade 9 is released from the strip by further rotation of the cam 24, the spring 18 forces the lower block 12 to its initial position, ready for the next scoring operation.

Instead of giving the scoring blade a reciprocating motion, I may secure the blade to the periphery of a rotating roll 23a, as indicated in Figure 12. The roll 23a is of predetermined size to provide the proper spacing between the scored lines. A smaller roll 24a may be provided under the strip 1 directly in line with the axis of the large roll 23a in order to hold the strip rigid during the scoring operation.

Another way in which the scoring operation may be accomplished is illustrated in Figure 13. In this case, the scoring blade 9 is carried by a heavy belt 25a which passes around one of the rolls 8 of the forming machine and also around a pulley 26a which may be power driven. The distance between the scored lines can be adjusted by changing the distance between the elements 8, 26a, as indicated by the dotted lines 27.

Figures 14, 15 and 16 illustrate a photoelectric arrangement for controlling the distance between the scored lines. As in the case of Figure 11, a reciprocating scoring blade 9 is carried by an upper block or plate 10 which is free to move in a vertical direction on a plurality of uprights 11. The latter are mounted on lower block 12 which rests on a plate 16 provided with a tongue 15. This tongue is received in a groove (not shown) formed in the block 12. A die block 14 rests on the plate 12 and supports the moving strip 1. The die block 14 is provided with a countersunk hole 14a, the purpose of which will be explained hereinafter.

There is also an abutment 17 which carries a rod 19, on which is mounted a compression spring 18. Compression springs 13 are mounted on the uprights 11 and, as in the case of Figure 11, serve to force the upper plate 10 away from the lower plate 12. In addition to the scoring tool or blade 9 referred to hereinbefore, the upper plate 10 carries a round punch 28, the purpose of which will appear presently. The plate 10 is given a vertical reciprocating motion by a cam 29 rotated through gearing by a motor 30.

There is an arm 31 projecting laterally from the lefthand end of the plate 10, and this arm carries a roller 32. A lever 33 biased at 34 bears against the roller 32. This lever is carried on an arm 35 which is pivoted at 36 to an upright 37. A contact 38 is secured to the arm 35 and this contact registers with a contact 39 positioned directly underneath.

There is another switch, typified by the arm 40, pivoted to the upright 41 and carrying a contact 42 which is positioned directly over a contact 43. The arm 40 is biased by a spring 44. A pivoted rod 45 connects the arm 40 to the core 46 of an electromagnet 47. The coil 47, as seen more clearly in Figure 15, is connected to the output circuit of an electrostatically controlled arc discharge device 48 which may comprise a thyratron consisting of a plate 49, a grid 50 and a cathode 51 typified as a filament. The plate circuit is energized by a suitable source of alternating current which passes through the coil 47. The filamentary cathode may be energized by a battery 52. The input circuit of the thyratron consists of a resistance 53 and a battery 54 poled in such a way as to make the grid 50 normally negative with respect to the cathode. A photoelectric tube 55 may be connected across the resistance 53 with its cathode 56 joined to the resistor by an equipotential conductor 57 and its anode 58 to the other end of the resistance through a battery 59.

Assuming that the positive terminal of the battery 59 is connected to the anode 58, it is apparent that, when light shines on the light-sensitive cathode 56, the battery tends to drive the point A positive, and this positive potential serves to offset the negative potential provided by the battery 54 through the resistor 53. Thus when the photoelectric tube is activated, the point A and, therefore, the grid 50 become more positive or less negative and ionization is produced in the tube 48 during the positive half cycle of the alternating plate potential. A large increase of current, therefore, flows through the coil 47 and the coil immediately draws its core downwardly. As the core 46 moves downwardly, a contact is made between the terminals 42 and 43 and a circuit established from the mains 60 through these contacts to the motor 30. The motor is then caused to rotate and, on rotation of the cam 29, the upper block 10 is forced downwardly, carrying with it the roller 32. This roller permits a holding or locking circuit to be established through the contacts 38, 39 which can be traced from the mains 60 directly to the motor, thereby causing the latter to continue its rotation.

It will be understood that the impulse applied to the grid 50 of the thyratron by the activation of the photoelectric tube 55 is only of momentary duration, so that the electromagnet 47 is automatically de-energized as soon as the plate potential passes through its zero value at the end of the positive half cycle. Under these conditions, the motor would stop if it were not for the establishment of the holding circuit through the contacts 38, 39. Consequently, when the photoelectric tube is activated, the thyratron 48 passes an arc discharge during the positive half cycle of the plate potential and connects the motor 30 to the mains 60 through the contacts 42, 43, which connection is held for a predetermined length of time by the holding circuit after the thyratron has become de-energized. The motor rotates the cam 29 which forces the upper plate 10 downwardly against the compression springs 13 and causes the blade 9 to form scored lines across the strip 1 and at the same time the punch 28 is driven through the strip into the countersunk hole 14a to leave spaced holes 61, as shown in Figure 16. The position of the arm 31 should be so adjusted that the holding circuit is maintained for almost a complete revolution of the cam 29, and the holding circuit is broken just before the plate 10, which is urged upwardly by the springs 13, reaches its uppermost position. The motor thereupon stops and is ready to be started again when one of the holes 61 passes in front of the light beam to cause energization of the electromagnet 47.

The photoelectric tube 55 is activated by a source of light 62 which passes through a lens 63 and one of the openings 61, as the apertured strip reaches that point. For convenience, the entire photoelectric unit, including the tube and light source, may be mounted in a pair of light-proof enclosures provided with the proper openings and all mounted on a carriage 64 which is free to travel on rails 65. As shown in Figure 14, this carriage may be rigidly secured at any position along the rails by a clamping device indicated at 66.

It is apparent that, as the carriage 64 is moved farther away from the punch 28, the less often will the thyratron 48 be energized by the photoelectric unit and hence the greater will be the distance between the aperture 61. Since the distance between the punch 28 and the scoring tool 9 remains constant, a movement of the carriage 64 will likewise control the distance between the scored lines 2. Other methods of controlling the distance between these lines will occur to those skilled in the art, for example, the light source may be mounted on the same side of the strip 1 as the photoelectric tube, and the latter may be activated by light reflected from a white spot on the strip. In such a case, it is apparent that the openings 61 and the punch 28 would be unnecessary.

While I have described my invention with particular reference to the use of stainless steel strip, it is by no means limited to this specific material. For example, Bakelite, fiber, cardboard treated with a hardening compound, or in fact any material which is readily bendable in strip form and can be formed into shape while in a relatively cold state may be employed. The depth of scoring will vary with the particular material and thickness of the strip. But in general, the scoring or other portion where the material is weakened should be of such a depth as to permit the strip to be formed in a shape without substantial heating and yet be readily fractured when a force of practical magnitude, usually applied by hand, is exerted along the scored or other weakened portion.

It will be understood that I desire to comprehend within my invention such modifications as come within the scope of the claims and the invention.

Having thus fully described my invention, what I claim as new and desire to secure by Letters Patent is:

1. A machine for producing a series of weakened scored portions in strip material consisting of means for producing a scoring crosswise of the strip, punch means associated with said scoring means and movable therewith to form a perforation in the strip in fixed relation to said scoring, means including an electrical circuit for actuating said scoring and punch means, means located on the delivery end of said punch means operatively connected with said electrical circuit to control the operation of said scoring and punch means, said control means including a light source on one side of the strip and a photoelectric tube on the opposite side thereof adapted to receive light from said source through a preformed perforation, said latter means being adjustable toward and away from said punch means to permit varying spacings between the scorings.

2. A machine for producing a series of weakened scored portions in strip material consisting of means for producing a scoring crosswise of the strip, punch means associated with said means and movable therewith to form a perforation in the strip simultaneously with the production of said scoring, means including an electric circuit for actuating said scoring and punch means, means located on the delivery end of said punch means and operatively connected with said electrical circuit to control the operation of said scoring and punch means, said control means including a light source on one side of the strip and a photoelectric tube on the opposite side thereof adapted to receive light from said source through a preformed perforation, said control means being adjustable toward and away from said punch means to provide varying spacings between the scorings.

ROGERS I. HUMPHREY.